United States Patent
Holloway et al.

(10) Patent No.: US 7,561,520 B2
(45) Date of Patent: Jul. 14, 2009

(54) CAPACITY LIMITING PLATFORM SYSTEM AND METHOD

(76) Inventors: J. Michael Holloway, 10813 Range View Dr., Austin, TX (US) 78730; Samuel R. Shiffman, 9614 Vista View Dr., Austin, TX (US) 78750

( * ) Notice: Subject to any disclaimer, the term of this patent is extended or adjusted under 35 U.S.C. 154(b) by 586 days.

(21) Appl. No.: 10/862,095

(22) Filed: Jun. 4, 2004

(65) Prior Publication Data

US 2005/0271051 A1   Dec. 8, 2005

(51) Int. Cl.
*H04L 12/16* (2006.01)
(52) U.S. Cl. .................. 370/235; 370/338; 370/349; 370/352; 370/389
(58) Field of Classification Search .......... 370/389, 370/229–238.1, 338, 349, 235, 352; 709/217–219
See application file for complete search history.

(56) References Cited

U.S. PATENT DOCUMENTS

2003/0067903 A1*   4/2003   Jorgensen ............ 370/338

* cited by examiner

*Primary Examiner*—Seema S Rao
*Assistant Examiner*—Wanda Z Russell
(74) *Attorney, Agent, or Firm*—The Law Firm of H. Dale Langley, Jr. P.C.

(57) ABSTRACT

Systems and methods limit capacity available for VoIP or other packetized data communications over a communications network. An initiator of the call is communicatively connected to the network, for example, by a gateway switch. The call has a particular destination communicatively connected to the network, such as a market gateway. An identifier of the destination is communicated over the network to a database. The database, via a load distribution proxy and capacity limiting proxies, controls whether or not the call is ultimately communicated to the destination, based on capacity loading then occurring at the destination.

14 Claims, 6 Drawing Sheets

CAPACITY LIMITING PLATFORM SYSTEM AND METHOD

BACKGROUND OF THE INVENTION

The present invention generally relates to communications networks and, more particularly, relates to high bandwidth communications networks, including Voice-over-Internet Protocol (VoIP) communications networks, and bandwidth loading and capacity limiting systems and methods therefor.

Voice-over-Internet Protocol (VoIP) telephony communications networks typically require significant bandwidth for operations, particularly where numerous VoIP calls are being concurrently made over the networks. Quality of VoIP service, as well as access to the service, is highly dependent on sufficient network bandwidth capacity. Conventionally, VoIP communications services have been limited because of the bandwidth requirements for such services, and also because of network congestion and usages by all network communications occurring concurrent with the services.

Network bandwidth has conventionally been available for network communications on a relatively ad hoc basis—that is, network communications use up whatever bandwidth may be available, from time to time, for the communications. Because VoIP communications often require high bandwidth capacities for quality and access of such services, there have been no assurances that sufficient bandwidth may, at any point, be available for suitable VoIP communications over the networks and branches of the networks. As with automobile traffic on roadways, bottlenecks and traffic slow-downs and congestion occur when sufficient bandwidth (e.g., roadway) is not available and traffic is attempting to flow. This has been the case with network bandwidth in network communications, and particularly applies where VoIP communications (and pluralities of such communications) are occurring concurrent with all other communications signal traffic over the network.

Packetized communications networks, such as, for example, the Internet in accordance with Transport Communications Protocol/Internet Protocol (TCP/IP) protocols or other networks according to other applicable network protocols, experience congestion of traffic where the traffic is not regulated or restricted. Typically, there have not been any particular means or elements to effect capacity limitations over communications networks, where the networks are employed simultaneously for VoIP communications and other uses. Providers of the network communications have been unable to guarantee or assure availability of particular bandwidth on networks as may be required by particular network communicators. Particularly where VoIP communications are mission critical services, providers have not been able to assure availability and quality of the VoIP communications because all are subject to network state and available capacities from time to time.

In VoIP communications network systems, analog voice signals are digitized and transmitted as a stream of packets over a digital data network. These systems enable real-time transmission of the voice signals as packetized data over networks that employ digital network communications protocols, including Transport Control Protocol (TCP), Real-Time Transport Protocol (RTP), User Datagram Protocol (UDP), and other Internet Protocol (IP) and network protocol suites. The digital networks that carry VoIP include the Internet and other digital data communications channels, such as public and private wired or wireless networks, WAN, LAN, WLAN, Wi-Fi, intranets/extranets, enterprise networks, and other conventional communications connectors and implementations and combinations thereof.

In the IP networks for voice communications, individual digital data packets are constructed corresponding to analog voice signals. The packets follow independent paths over the networks to the intended destination. Packets associated with a particular source in such networks can, thus, take many different paths to the destination for the packets. The packets can arrive at the destination with different delays, arrive out of sequence, or not arrive at all. The destination for the packets must re-assemble and convert the packets back to original analog voice signals.

The current VoIP communications can comply with several possible standards, and it is expected that varied and additional standards will arise. The most commonly followed standard at present appears to be the ITU-T H.323 standard, although other standards employed include H.248, H.323, IETF, ITU, IETF TFC 2885, Media Gateway Control Protocol (MGCP), and Session Initiation Protocol or IETF RFC 2543 (SIP), among others. Generally, each of the various standards in VoIP implementations do not encompass all aspects of VoIP communications. The variations among the various standards, and also the networks and equipment therewith employed, include algorithms, bandwidth limitations, packet loss recovery, compression, speech processing, and other concepts for improved communications, efficiencies, and speed.

In general, the VoIP technology (whatever it may be, in the particular circumstance) allows voice calls originated and terminated on standard telephones supported by the public switched telephone network (PSTN) and IP communications endpoints (e.g. IP phone) to be conveyed over IP networks. Gateways for the VoIP digital data packets provide the bridge between the local PSTN and the IP network, at both the originating and terminating sides of a VoIP call. In the case of a call that is originated and terminated on the PSTN, to originate a call, the calling party accesses a nearby gateway, either by a direct connection or by placing a common analog call over the local PSTN and entering the desired destination phone number. The VoIP technology translates the destination telephone number into a network address, i.e., an IP address, associated with a specific terminating gateway at the destination of the call. At the terminating gateway, a call is initiated to the destination phone number over the local PSTN to establish end-to-end two-way communications. Thereafter, the analog voice signals entered on each end are digitized into packets and communicated over the packet network at each respective transmitting gateway, and the digitized packets so communicated are reassembled and translated back into the analog voice signals corresponding to the received packets from the network at each respective terminating gateway. In the case where one or multiple of the end-points is not the PSTN an IP communications endpoint (e.g., communications gateway) replaces the gateway in the call flow, and performs the same function of converting voice (or other communications methods) to IP format data signals.

Because quality and availability of VoIP communications over data networks is highly dependent on adequacy, quality and sufficiency of network capacity, it would be a significant advantage and improvement in the art and technology to provide systems and methods for assuring available network capacity for use in making VoIP telephony calls over the network. The present invention provides capacity limiting features to communications network operations, in order to make better available network bandwidth for VoIP communications or other mission critical bandwidth usages. Furthermore, the present invention provides numerous advantages and improvements in the art and technology, including by making quality and availability decisions based on higher-level applications and not only the lower-level network itself.

SUMMARY OF THE INVENTION

An embodiment of the invention is a platform for distributing packetized data communications over a network. The platform includes an initiator of communications communicatively connected to the network, a destination of communications communicatively connected to the network, an identifier of the destination, communicated over the network, and a database for controlling communications by the initiator to the destination.

Another embodiment of the invention is a system for making a VoIP call over a packetized data network. The call is made to a call destination communicatively connected to the network. The system includes a capacity limiter communicatively connected to the network, for limiting the call if excessive bandwidth of the network is required for the call to the call destination.

Yet another embodiment of the invention is a method of calling over a network, via a packetized data communication on the network. The method includes initiating the a call via a first gateway, and limiting a capacity of a second gateway to receive the call.

Another embodiment of the invention is a system for making a packetized data call over a network. The system includes a limiter for determining a capacity of the system for receiving the call, and a communicator for the call if the limiter determines that the capacity can accommodate the call.

BRIEF DESCRIPTION OF THE DRAWINGS

The present invention is illustrated by way of example and not limitation in the accompanying figures, in which like references indicate similar elements, and in which.

DETAILED DESCRIPTION OF THE INVENTION

Figure 1:
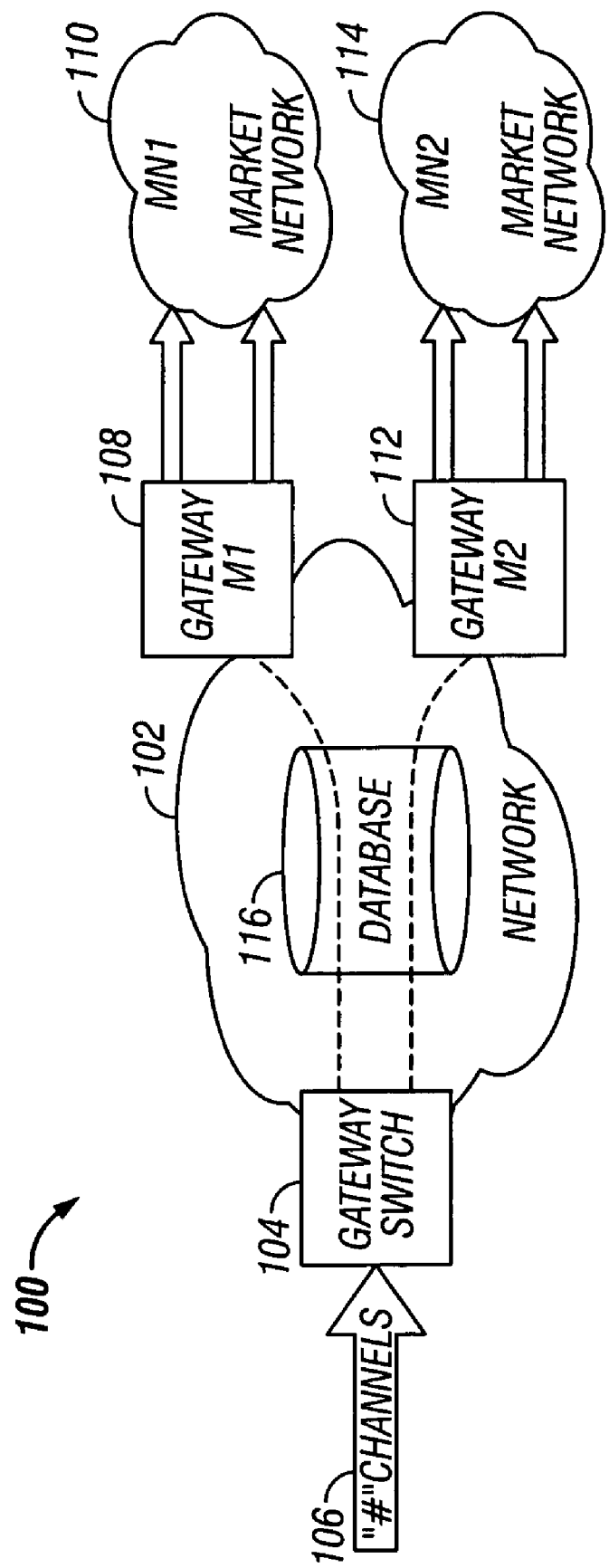
FIG. 1 illustrates a system for VoIP calls over a network, such as the Internet, including a platform to limit the calls or the extent of the calls based on a capacity limitation for the receiving end of the calls, according to certain embodiments of the invention.

Referring to FIG. 1, a system 100 for network communications includes a packetized data network 102, such as the Internet or some other communicatively interconnected collection of elements and devices. The network 102 communicatively connects, by wire, wireless, optical and other communications connections, a wide variety of communications devices capable of packetized data transmission and reception over the network 102. The communications devices are, for example, network-connected computers, laptops, data telephones, personal digital assistants (PDAs), messaging units, and any other of a wide assortment and variety of devices capable of data communications over networks. The network 102 operates by transferring transmissions of signals from devices according to a packetized data protocol, for example, TCP/IP as with the Internet and other networks or other proprietary or non-proprietary protocols for such communications.

The network 102 can include wired, wireless, and other communicative segments or links, which can form and themselves include various pluralities of trunk lines, branches, localized segments, local area networks, wide area networks, virtual private networks, segmented and secured networks, enterprise networks within organizations or companies, and any other of a wide assortment of component and ancillary networks and devices. Devices and elements (both individual devices and sub- and ancillary networks and the like) operating to communicate over the network 102 connect to the network 102 via a gateway switch 104 communicatively connected to the network 102. The gateway switch 104 is maintained, for example, by an Internet service provider that enables VoIP data communications and the like over the network 102. Of course, pluralities of the gateway switch 104 and similar network-access devices and facilities are comprehended as included in and ancillary to the network 102, however, the gateway switch 104 is an example of a communications gateway to the network 102.

The gateway switch 104 is connected to various communications devices accessing the network 102 via the gateway switch 104. VoIP communications channels 106, connected to the gateway switch 104, are one type of communications and associated communications devices and elements that access the network 102 via the gateway switch 104. For example purposes in the Figure, a certain number of communications channels "#" is illustrated as concurrently connecting to the network 102 via the gateway switch 104. Of course, pluralities of gateways and connections making VoIP communications channels, as well as wide variety of other data and communications signal channels and connections, are included in the network 102; however, the # of VoIP communications channels 106 exemplified in the Figure is illustrated for example and explanation of an "ingress" communication channel to the network 102.

The network 102 also communicatively connects to various "egress" communication channels and vehicles. A first market gateway 108 and a second market gateway 112 are communicatively connected to the network 102, as illustrated for example purposes to show other ends of communications occurring over the network 102. As those skilled in the art will understand, know and appreciate, the network 102, and the connected gateway switch 104 and respective first market gateway 108 and second market gateway 112 can (and typically are) remotely located and widespread in geographic and virtual location as made possible by the interlinks and segments of the network 102 and the operations of the network 102.

The first market gateway 108 is communicatively connected to and serves a first market network 110. The first market gateway 108 is maintained, for example, by an Internet service provider that enables VoIP data communications and the like over the network 102. The first market network 110 is, itself, a sub-network or ancillary network of the network 102, and includes various communicative elements, devices, links, channels and segments for effecting VoIP and other packetized data communications via and over the network 102 through the first market gateway 108. The second market gateway 112 is substantially like the first market gateway 108, in configuration and operations via the network 102, however, the second market gateway 112 is communicatively connected to and serves a second market network 114. The second market network 114, like the first market network 110, is comprised of sub- or ancillary networks and elements, devices, links, channels and segments. Typically, but not necessarily, the first market network 110 and the second market network 114 are geographically regionally distinct or substantially separate groups and organizations of users communicating over the network 102 through the respective market gateways 108, 112.

Of course, pluralities of the market gateways 108, 112, serving pluralities of market networks 110, 114, respectively, are included in the system 100 and communications are via the network 102. The particular market gateways 108, 112, and the respective market networks 110, 114, are intended as exemplary. For purposes of the description herein, the first and second market networks 110, 114 are each communicatively capable of enabling VoIP communications from and to the market networks 110, 114 (and specific devices and elements thereof) over the network 102.

The system 100 further includes a database 116. The database 116 is communicatively connected to the network 102 (and can be part of the network 102 or otherwise), and facilitates data communications occurring over the network 102. Particularly, the database 116 handles aspects of VoIP communications over the network 102 and, more particularly for purposes of exemplary description but not limitation of scope or exclusive nature, the database 116 (in the example of FIG. 1) monitors and counts, including by limiting capacity as hereinafter more fully described, states and communications of the first market network 110 and the second market network 114, because of VoIP calls being concurrently made over the network 102 between the # channels 106 via the gateway switch 104, to and from each of the first and second market networks 110, 114 via the respective market gateways 108, 112.

The database 116 monitors a state of the bandwidth capacity usage being made by the first market network 110. Concurrently, the database monitors a state of the bandwidth capacity usage being made by the second market network 114. The database 116, then, based on the particular states so monitored, counts calls then being made to the respective market networks 110, 114 so as to limit numbers of calls to either of the market networks 110, 114 according to pre-set capacity limitations according to available bandwidth of the network 102 and the market networks 110, 114. In effect, the database 116 keeps the state consistent on the "ingress" side (e.g., the # channels 106) and adjusts the state on the "egress" side (e.g., by limiting a concurrent capacity of either the communications traffic to the first market gateway 108 and the first market network 110, and/or to the second market gateway 112 and the second market network 114.

In an example of the system 100 for purposes of understanding but not limitation, the # channels 106 is ten VoIP call communication channels. Each of these # channels 106 accesses the network 102 for communications over the network 102 via the gateway switch 104. The network 102 carries the VoIP calls of the # channels 106, by routing and distribution generally according to conventional paths of communications over the network 102, as from time to time occurring; however, the database 116 either receives those calls or indications of those calls in connection with the communications over the network 102.

The database 116, according to pre-programmed (e.g, either pre-set, fixed, or dynamic according to algorithms and logical determinations) controls, then limits capacity at the first market gateway 108 and/or the second market gateway 112, as is desired to limit capacity of bandwidth utilized at any instant over the respective market networks 110, 114. In the example of ten VoIP call communication channels as the # channels 106, the calls over the channels are, for example, directed as four of those channels to the first market network 110 and six of those channels to the second market network 114. If the second market network 114, however, has available bandwidth to handle only four of the channels at an instant, then the database 116, via monitoring, counts the calls. The database 116 prioritizes sequence and extent at which the calls, within the bandwidth limitations set for the second market network 114, continue over the network 102 to the respective second market gateway 112 of the second market network 116.

In this manner, the database 116 of the network 102 controls or dictates the number of VoIP channels, and thereby the capacity limits, for the respective first and second market networks 110, 116. The database 116, thus, effects handling of the VoIP calls over the network 102 at any instant, particularly based on whether or not available capacity at the market networks 110, 116 can accommodate the particular calls on the network 102 at the instant. Particularly, the database 116 performs the allocation of VoIP call traffic among the market networks 110, 116, by virtue of variables detected and monitored by the database 116 regarding the states of the market networks 110, 116 and also by virtue of the specific programming of the database 116 as to loading and capacity limitations for the respective market networks 110, 116.

Figure 2:
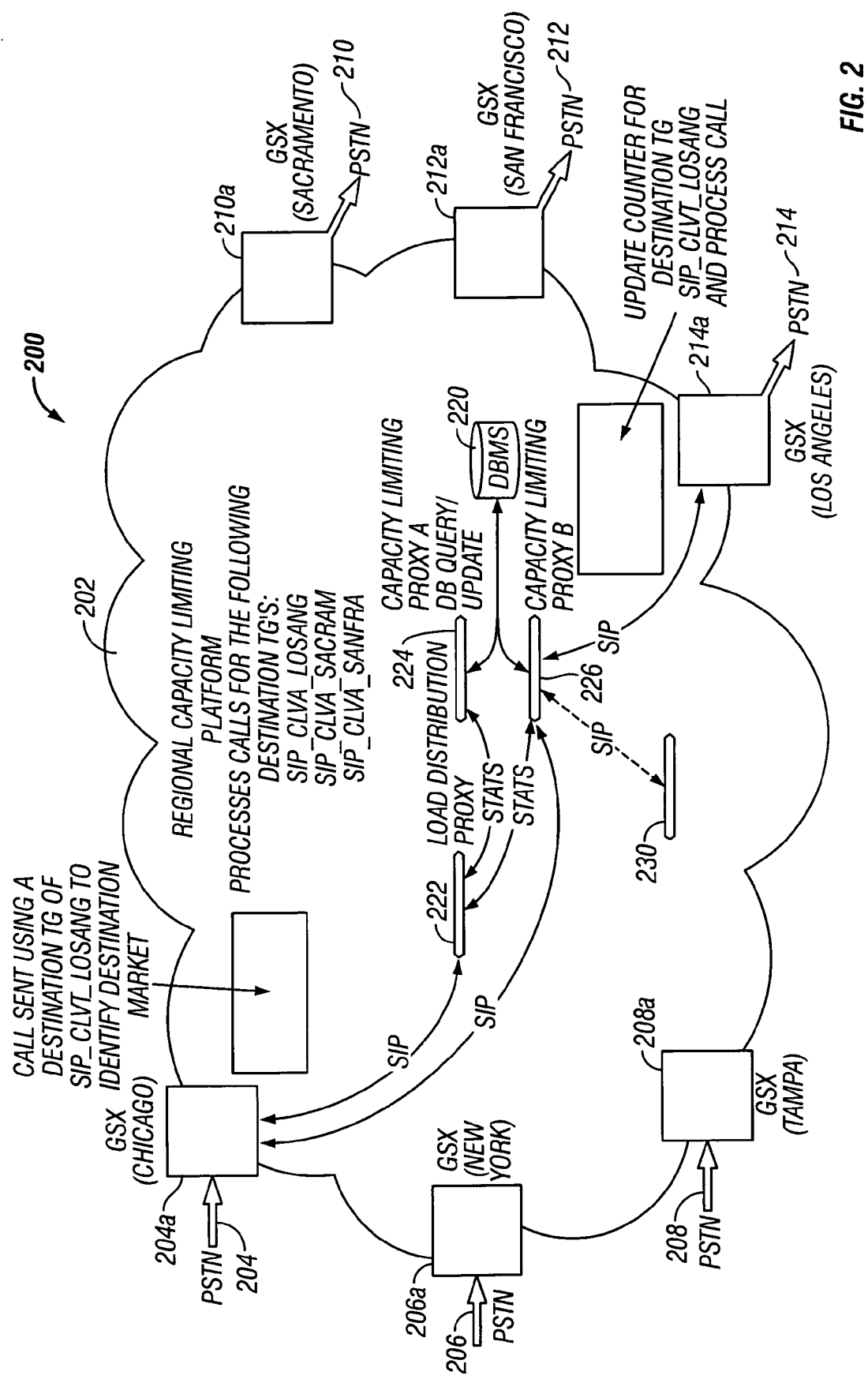
FIG. 2 illustrates an example of the system of FIG. 1, serving several markets, according to certain embodiments of the invention.

Referring to FIG. 2, an example implementation of the system 100 of FIG. 1 is illustrated by a system 200. The system 200 includes and communicatively interconnects via a network such as an Internet 202, several (e.g., six in the example) regionally situated or servicing market networks 204, 206, 208, 210, 212, 214 (e.g., Chicago, New York, Tampa, Sacramento, San Francisco and Los Angeles, respectively). For purposes of description but not limitation, the market networks 204, 206, 208 are indicated as calling or "ingress" callers, whereas the market networks 210, 212, 214 are indicated as receiving or "egress" receivers. (Although not particularly shown in the Figure, each market network will, itself, include various individual devices for VoIP calls, which can be further or additionally connected and internetworked for communications from and to the applicable market network.) In actual practice of the system 200, ingress and egress of the respective market networks will be duplexed, such that communicated VoIP signals will travel back and forth between the market networks 204, 206, 208, on the one hand, and the market networks 210, 212, 214, on the other hand. Also, the system 200 can include additional and alternative pluralities of the market networks, or other calling entities and complexes however described or termed. In any event and for purposes of explanation of the capacity limiting features of the system 200, however, the respective market networks 204, 206, 208, 210, 212, 214 (e.g., the market networks 204, 206, 208 being the initiating or "ingress" call function, and the market networks 210, 212, 214 being the receiving or "egress" call function, for purposes of example) and functionalities of the system 200 will be substantially the same, whatever the entire system, networks, sub-branches and segments, and devices may be.

Each of the market networks 204, 206, 208, 210, 212, 214 is communicatively connected to the Internet 202 via a respective gateway switch 204a, 206a, 208a, 210a, 212a, 214*a*. Within or communicatively connected to the Internet 202 is a database 220. The database 220 serves to limit VoIP calls being made over the Internet 202 as to the respective markets 204, 206, 208, 210, 212, 214 at the respective gateways 204*a*, 206*a*, 208*a*, 210*a*, 212*a*, 214*a*.

The database 220 comprises a platform including a load distribution proxy 222, one or more capacity limiting proxies 224, 226, and a switch 230 for routing, each communicatively connected to the database 220 and the Internet 202. Each of the proxies 222, 224, 226 operates, for example, according to the Session Initiation Protocol (SIP) to receive and send communications over the Internet 202 and in communicative connection and control of the database 220. As those skilled in the art will know and appreciate, SIP is an Internet Engineering Task Force (IETF) standard protocol for initiating an interactive session. SIP is conventionally employed to establish Internet telephony calls, and modify, or terminate them, for example, VoIP telephony calls. SIP supports name mapping and redirection services, therefore, it makes it possible for calls to be initiated and received from any location, and for networks, such as the Internet 202, to identify the callers wherever they are situated. Callers and those being called are identified, authorized and communications established by use of SIP addresses of the respective communicators, via SIP requests-responses of the protocol at the Applications layer of the Open System Interconnection (OSI) communications model.

The load distribution proxy 222 is a proxy server, for example (but not limitation), based on a derivation of the Vovida Vocal platform (i.e., an open source development of variety of protocol stacks including SIP, MGCP, TRIP and RADIUS). Provision of such proxy server is primarily via XML files. The Vovida platform and SIP signaling are specifically described herein with respect to the embodiments, however, this is intended solely for explanation and demonstration and other, different, additional and combined platforms and signaling are possible and included in the embodiments. The proxy server, such as the Vovida Vocal platform, is based on the Vovida SIP stack and includes, among others, the following features: Marshal server—controls network access, stateful; Redirect server—redirects calls to other marshal servers; Feature server—voice mail, conferencing, and other; H.323 to SIP Gateway—protocol conversion; Load balancing proxy—front end to marshal servers distributing calls over various marshal servers.

Each capacity limiting proxy 224, 226 is also a proxy server, for example, of similar architecture and arrangement to the load distribution proxy 222, including, for example, the Vovida Vocal platform.

In operation, the load distribution proxy 222, via communicative connection to the call limiting proxies 224, 226 and the Internet 202, disperses VoIP calls communicated over the Internet 202 between each of the several call limiting proxies 224, 226. The load distribution proxy 222, via such communicative connection, determines and maintains data of the network 202 relative to a current number of active calls then occurring over the network 202 between the gateway switches 204*a*, 206*a*, 208*a* and the market gateways 210*a*, 212*a*, 214*a* and also relative to a current number of calls per second (CPS) that each of the call limiting proxies 224, 226 is then sustaining. The data representative of the number of active calls and the CPS is employed by the database 220 and the load distribution proxy 222, operating in conjunction, to logically determine which of the call limiting proxies 224, 226 will receive each of the next incoming VoIP calls on the Internet 202. The call limits for operations of the load distribution proxy 222 and the database 202 in rejecting or otherwise handling next calls, is designed as desired for the application, for example, based on a maximum sustained call rate that each particular capacity limiting proxy 224, 226 can handle times the particular number of proxies 224, 226. Additionally, the load distribution proxy 222, operating with the database 220, can throttle calls when excessive capacity is required for the calls, such as in order to avoid gateway switch timeout when capacity limits are reached.

The load distribution proxy 222, in conjunction with the database 220, rejects next calls if the determination at the instant is that the system 200 is at a maximum capacity (e.g., as dictated by programmed or pre-set variables and logic for the database 220 and proxy 222). In the case of rejection of next call, a SIP 502 (Bad Gateway) response is returned to the respective call originating gateway switch 204*a*, 206*a*, 208*a*, by the proxy 222 and database 220 operations. Then, the applicable gateway switch 204*a*, 206*a*, 208*a*, upon receiving the SIP 502 response, can alternate a route for the particular VoIP call.

Each capacity limiting proxy 224, 226 is a stateful SIP proxy that limits a number of then concurrent VoIP calls that are at the instant being made to the applicable market networks 210, 212, 214, respectively, served by the respective proxy 224, 226. Each proxy 224, 226, in conjunction with the database 220, retains a limit value for calls with respect to each particular market and market network 210, 212, 214, respectively. The respective market networks 210, 212, 214 are each identifiable to the proxy 224, 226 via a unique destination trunk group (DTG) that is provisioned on the gateway switches 204, 206, 208 portion of the network 202.

In practice, the applicable DTG with respect to a particular VoIP call on the network 202 is communicated, over the network 202, from the respective call initiating gateway switch 204, 206, 208 to the respective proxy 222, 224, operating in conjunction with the database 220. Via the DTG, the database 220, in conjunction with the respective capacity limiting proxy 222, 224, identifies the destination market network 210*a*, 212*a*, 214*a* for the particular call, and determines whether or not capacity limits are sufficient to accommodate the call. Additionally, a number or indicator of the then-current active calls for the particular destination market network 210*a*, 212*a* is maintained by the database 220 and the proxy 222, 224, via identification of prior and concurrent calls and particular programming and settings of the database 220 and the proxy 222, 224. As an example of particular programming and settings of the database 220, multiple DTGs can be grouped together to form one logical DTG, in which capacity limiting functions can be applied.

In the event that a maximum capacity applicable to the particular destination market network 210*a*, 212*a*, 214*a* is then reached or exceeded (or will be reached or exceeded because of the then-current call), a SIP 503 response is sent over the network 202 by the proxy 222, 224 in conjunction with the database 220. The SIP 503 response is receivable by the applicable initiating gateway switch 204*a*, 206*a*, 208*a* for the particular call. The SIP 503 response forces the call to be returned to the originating market network 204, 206, 208 (and to the particular device/user thereon) via the network 202 and the respective gateway switch 204*a*, 206*a*, 208*a*. At the market network 204, 206, 208 and gateway switch 204*a*, 206*a*, 208a, further processing and alternate routing of the call can be made. For purposes of example and as shown in FIG. 2, a naming convention of the DTG can be similar to:

SIP_CL<digit customer identifier>_<6 digit destination market>

SPECIFIC EXAMPLE

SIP_CLVT_LOSANG

Of course, other, further and alternative conventions can be employed as desired for the application and arrangement.

One such further and alternative convention can be if a maximum capacity applicable to the particular destination market network 210a, 212a, 214a is then reached or exceeded, the switch 230 routes the call to the destination market network 210a, 212a, 214a (and, thus, to the ultimate recipient device of the destination).

In the example of FIG. 2, a VoIP call is illustrated as initiated from the market network 204 via the gateway switch 204a communicatively accessing the Internet 202. In conjunction with the initiation of the VoIP call, a SIP-based communication (A and/or A') is directed to and received by the load distribution proxy 222 and/or one of the capacity limiting proxies 224, 226 over the network 204. The load distribution proxy 222, in connected communication with the applicable capacity limiting proxy 224, 226 and the database 220, shares state information regarding the calls then being conducted, including the call volumes then being accommodated the respective market network 210, 212, 214 to which the VoIP call being initiated. The load distribution proxy 222 then directs the particular capacity limiting proxy 226 to handle the SIP-based communication. The capacity limiting proxy 224, 226, via particular routing by the switch 230, directs the SIP-based communication according to the particular market gateway 214a and network market 214 to the intended destination market 214, if sufficient capacity of the market 214 can handle the call, and the ingress group has not reached its preset or other, fixed, or dynamic according to algorithms and logical determinations set capacity limits.

As further illustrated in the FIG. 2, the particular DTG corresponding to the call—e.g., SIP_CLVT_LOSANG—permits appropriate processing and determinations of available capacity for the call. The DTG also permits update of counters of the proxy 222, 224, 226 and database 220 implementation, in order that states of capacity availabilities is maintained for determinations with respect to next calls. The particular platform, comprised of the load distribution proxy 222, the applicable capacity limiting proxies 224, 226, and the database 220 operate in communicative conjunction with the network 202, in order to distribute and limit capacities of bandwidth occupied at the market networks 210, 212, 214 by VoIP calls over the network 202.

Figure 3A:
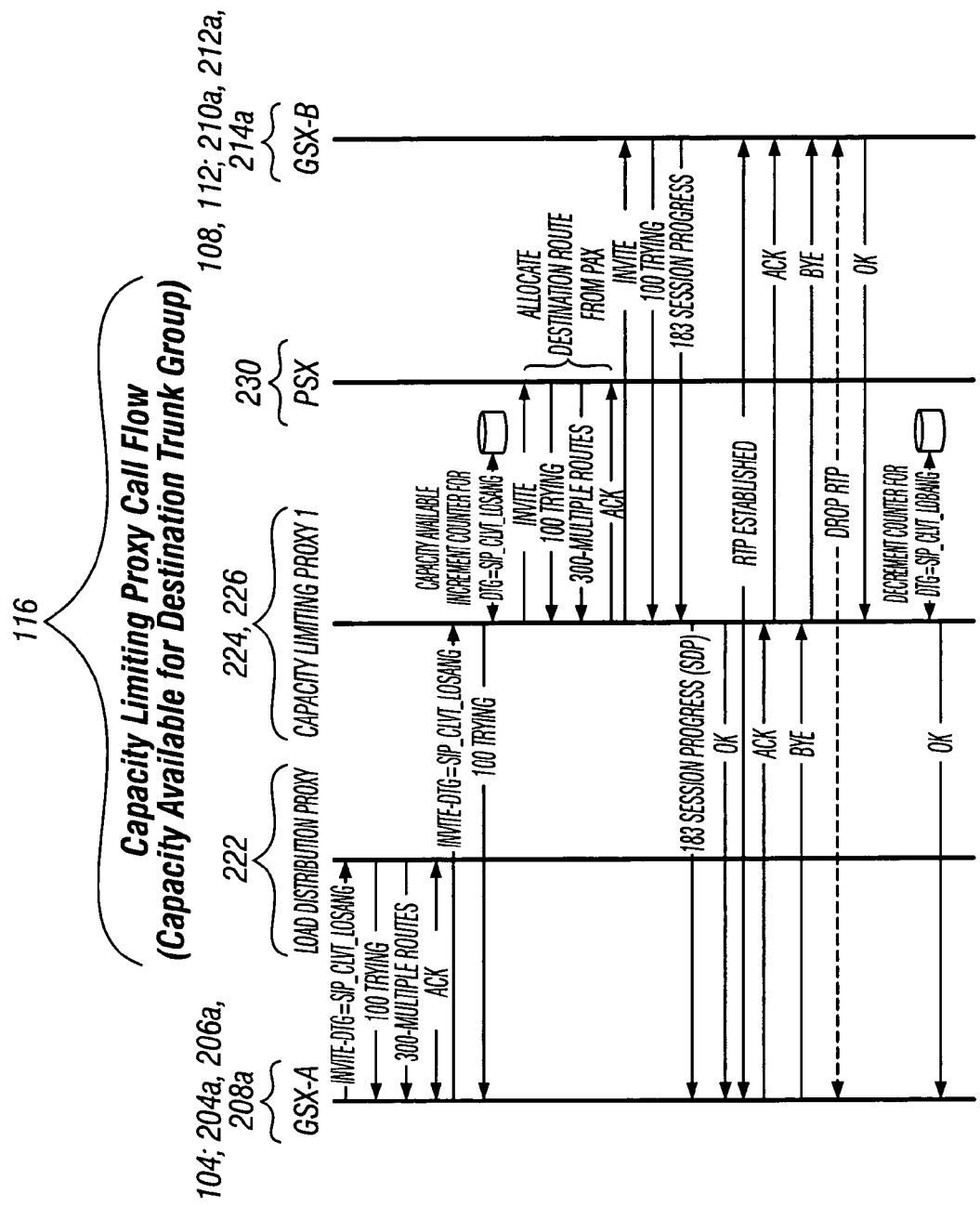
FIGS. 3*a-c* illustrate call event sequences for instances in which capacity can accommodate a call at the receiving end of the call, capacity can not, because of a capacity maximum, accommodate the call at the receiving end of the call, and the call can not be made because of unavailability of a platform that limits the calls, according to certain embodiments of the invention.
Figure 3B:
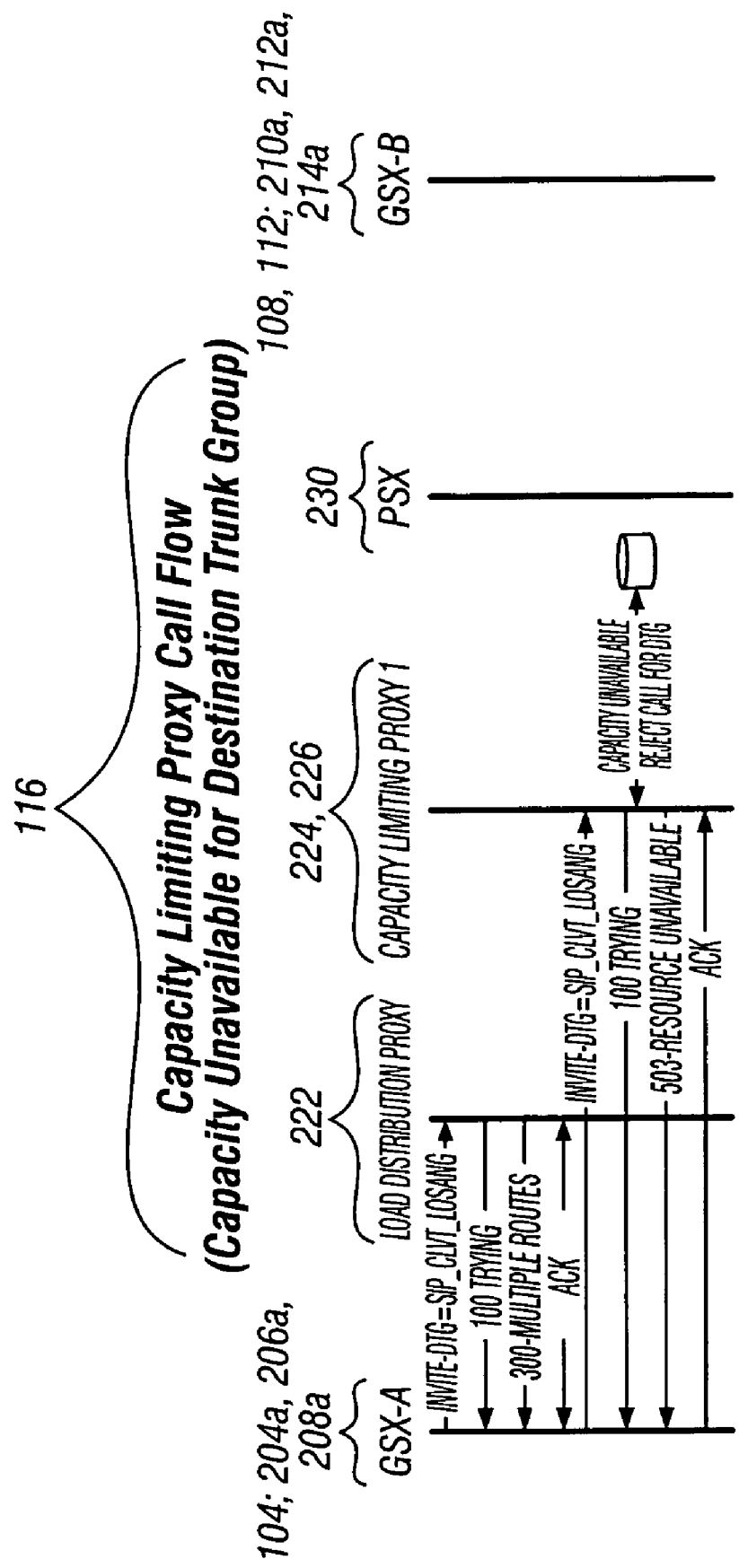

Referring to FIGS. 3a and 3b, communications flows and occurrences are shown for the respective situations of: (i) capacity available for the call at the applicable network market; and (ii) capacity unavailable for the call at the applicable network market. Referring to FIG. 3a, in conjunction with FIG. 1 and FIG. 2, call events occurring over the network, such as the Internet, are illustrated for each of the gateway switch 104 (204a, 206a, 208a in FIG. 2), the database 116 (including the load distribution proxy 222 and the capacity limiting proxies 224, 226 of FIG. 2), and the market gateway 108 or 112 (210a, 212a, 214a in FIG. 2). For ease of reference and discussion in the succeeding, only references to FIG. 1 will be employed; however, this is for example purposes only.

Additionally for example but not limitation, if the database 116 determines that the ingress group (an ingress group is the grouping of ingress trunks that have the same capacity limitations enforced grouping of originating trunks in said ingress group), is at its preset or other, fixed, or dynamic according to algorithms and logical determinations set capacity limits, the database 116 responds over the network 102 to or via the initiating gateway 104 with an indicator of the unavailability.

Referring first to the case of FIG. 3a, the call events illustrate initiation of a VoIP call on the network 102 via or through the gateway 104. A call Invite is made over the network 102, such as the Internet, to the database 116 (i.e., to be understood as comprised of the load distribution proxy 222, the capacity limiting proxies 224, 226, and the database 220 as to the example in FIG. 2). The Invite can have several attempts.

Assuming the Invite is received by the database 116, the database 116 (i.e., via the operative cooperation and intercommunications of the load distribution proxy 222, the capacity limiting proxies 224, 226, the switch 230, and the database 220 in FIG. 2) detects the call, makes a determination about availability of adequate capacity of the applicable 15, market network 110, 114 and respective market gateway 108, 112 for accommodating the call. If capacity is adequate, the switch 230 routes the call over the network 102 to the destination market network 110, 114 via the market gateway 108, 112.

The call then progresses, with an increment counter at the database 116 recording and retaining the fact of the existence of the call. The call then occurs over the network 102 according to VoIP protocols. Thereafter, when the call is terminated, a decrement counter at the database 116 records and retains the fact of non-existence of the call. The determinations at the database 116 for next calls is, thus, made in accordance with the information regarding existing calls as recorded and retained at the database 116 from time to time at each instant.

Referring next to the case of FIG. 3b, the call events also illustrate attempts at initiation of a VoIP call on the network 102, but where the market network 110, 114 via the respective market gateway 108, 112 then has reached or would reach or exceed maximum capacity for the mark network 110, 114 because of the call. A call Invite is made over the network 102, such as the Internet, to the database 116 (i.e., to be understood as comprised of the load distribution proxy 222, the capacity limiting proxies 224, 226, and the database 220 as to the example in FIG. 2). The Invite can have several attempts.

Assuming the Invite is received by the database 116, the database 116 (i.e., via the operative cooperation and intercommunications of the load distribution proxy 222, the capacity limiting proxies 224, 226, the switch 230, and the database 220 in FIG. 2) detects the call, makes a determination about unavailability of adequate capacity of the applicable market network 110, 114 and respective market gateway 108, 112 for accommodating the call. If capacity is inadequate, the database 116 responds over the network 102 to or via the initiating gateway 104 with an indicator of the unavailability.

The database 116 does not change any state, including the increment and decrement counters are not operated, or if state is changed the net results will be no change in state (e.g. counter incremented and decremented).

As previously mentioned, the initiator of the call, through or via the gateway 104, can then try the call again at a different instant in time or other operations or processing can be made, such as alternative routing and so forth.

Figure 3C:
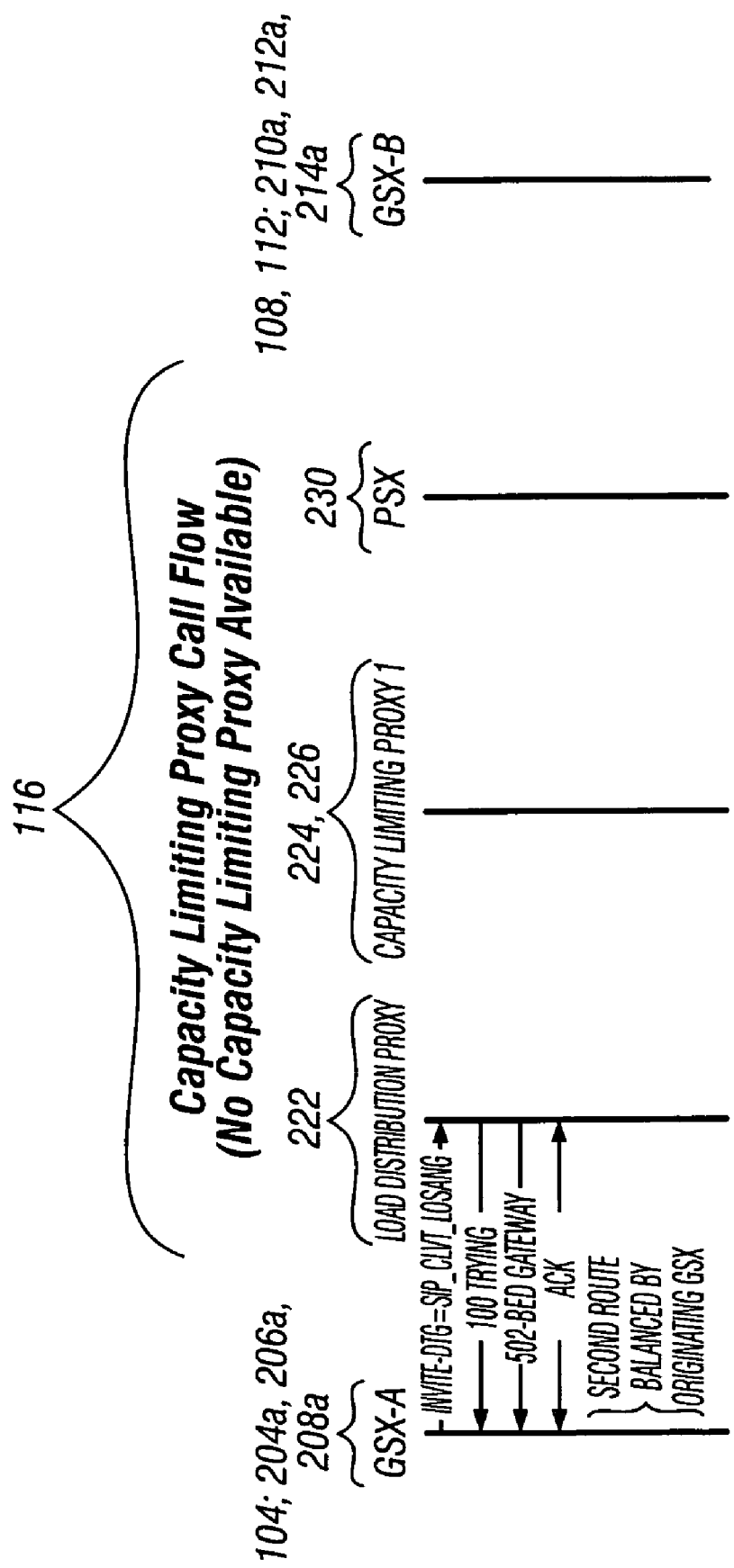

Referring to FIG. 3c, similar call events are illustrated for the case in which the database 116 operations (e.g., because there is not any capacity limiting proxy 224, 226 that is then available) do not accommodate the capacity for the call. In such event, a SIP 502 (Bad Gateway) response is returned to the initiating gateway 104 (and to the call initiator's device or so forth). Of course, in such event and response, an alternative routing or other operations and processing can be made for calling.

Figure 4:
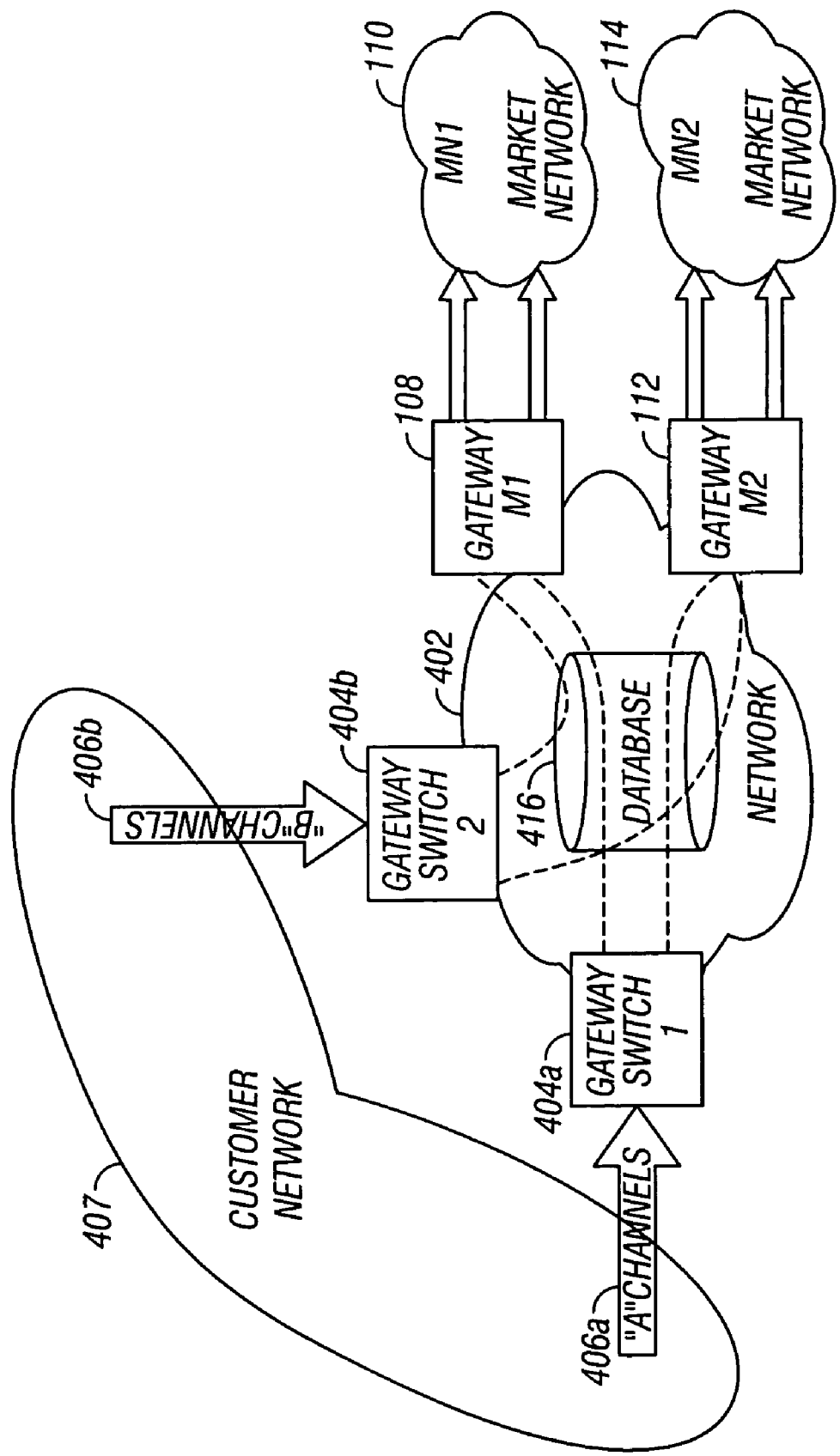
FIG. 4 illustrates a system for VoIP calls over a network, such as the Internet, including dual originating gateways accessing the network via a platform to limit the calls or the extent of the calls based on a capacity limitation for the receiving end of the calls, according to certain embodiments of the invention.

Referring to FIG. 4, another example implementation of the system 100 of FIG. 1, similar to that of example of FIG. 2, is the system 400. The system 400 includes more than one initiating gateway—i.e., a first gateway switch 404a and a second gateway switch 404b. Each gateway switch 404a, 404b can handle a number of call channels, such as, for example, a number "A" channels 406a and a number "B" channels 406b. In the example, each gateway switch 404a, 404b is communicatively connected to a customer or customer network 407. For instance, the customer network 407 in the example can be a call center or other user or collection of users requiring extensive VoIP call access to and usage of a network 402, such as the Internet.

Each gateway switch 404a, 404b is communicatively connected to the network 402. The network 402 includes or is communicatively connected to or operational in conjunction with the database 416. Although not shown in detail in FIG. 4, the database 416 is substantially comprised and functional as has been previously described, for example, including load distribution proxies, capacity limiting proxies, database, and switch (refer to FIG. 2) and combinations, additions and alternatives thereto.

The database 416 communicatively connects, over the network 402, to market gateways 108, 112. These market gateways 108, 112, as previously described, communicatively connect and permit access for various respective market networks 110, 114 to the network 402.

In the example, the database 416 operates substantially in accordance with the functionalities previously described. Particularly, the database 416 serves as load distribution proxy(s), capacity limiting proxies, and switch. The database 416 can limit capacities experienced by the market networks 110, 114, in accordance with the design and desired operations of the system 400.

Numerous variations and alternatives are possible and included in the descriptions and examples herein. Particularly, numerous and varieties of customers/customer networks, gateway switches (e.g., communications gateways), database (including, without limitation, numerous and varied load distribution proxy(s), capacity limiting proxies, database, and switch), market gateways (e.g., communications gateways), and market networks are possible in any particular system. In each event, the platform operating to provide the database functions of the system (whatever the particular elements, components, connections, and specifics) is incorporated in the network, such as the Internet, in order to distribute VoIP calls among routes and network paths and to limit capacity usages to maximum set or logically determined values for market networks.

In addition to general and generic or similar functionality variations and alternatives, specifics of the platform and systems are possible and also included hereunder. For example, the Vovida Vocal platform is one of among many possibilities. Presently, the Vovida platform performs at about 25 CPS on a given configuration; however, this and all other aspects may and are likely to change or progress. Moreover, using an open source stack or application can possibly present risks of reliability and so forth that alternatives, additions and improvements can overcome; therefore, all other possible stacks or applications are possible. A particular database function can be provided by a standard DBMS database application, such as Sybase or Oracle, or any other useable database functionality or application is also possible. Furthermore, although specific call events, responses (e.g., 503 and 502 responses) and similar aspects described in the foregoing can vary or alternatives or additions are possible. Of course, those skilled in the art will know and understand many of the possible changes and variations and all are included in the foregoing descriptions. Also, it is expected that improved and new functionalities and technologies for any or all of these and other elements, components, communications, and the like are or will be developed and useable in the foregoing descriptions, and all such matters are included for purposes hereof.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for distributing packetized data voice call communications over a data network, the network comprises a plurality of sub-networks, the sub-networks are variably interconnected and non-segregated in the network, each sub-network having a respective sub-network bandwidth of the sub-network, comprising:
   an initiator gateway of the network, for admitting ingress to the network of a packetized data voice call requiring a call bandwidth on the network;
   a destination gateway of the network, for admitting egress of the packetized voice call from the network if received at the destination gateway;
   a destination sub-network of the destination gateway, being at least one of the plurality of sub-networks of the network, the destination sub-network having a then-unused and available destination sub-network bandwidth for accommodating communications;
   an identifier of the destination sub-network for the destination device, communicated over the network; and
   a database intermediately connected to the network between the initiator gateway and the destination gateway, for receiving the identifier, the database comprises;
   a load distribution proxy connected to the destination sub-network by the network;
   a capacity limiting proxy connected to the destination sub-network by the network and to the load distribution proxy; and
   a processor connected to the load distribution proxy and the capacity limiting proxy, for determining, based on the identifier, the then-unused and available destination sub-network bandwidth;

wherein the database, based on the identifier, determines whether the then-unused and available destination sub-network bandwidth can accommodate the call bandwidth of the packetized data voice call;

wherein the database controls the load distribution proxy to route communications within the destination sub-network to provide the then-unused and available destination sub-network bandwidth;

wherein the database controls the capacity limiting proxy to restrict the packetized data voice call over the sub-network bandwidth if the then-unused and available destination sub-network bandwidth can not accommodate the call bandwidth.

2. The system of claim 1, wherein the initiator gateway communicates over the network to the load distribution proxy at admission of the packetized data voice call to the network; and wherein the load distribution proxy responds to the initiator gateway indicating either:

if the capacity limiting proxy can not accommodate the call bandwidth within the then-unused and available destination sub-network bandwidth, that the packetized data voice call over the network will be restricted; and if the capacity limiting proxy can accommodate the call bandwidth within the then-unused and available destination sub-network bandwidth, that the packetized data voice call over the network can be completed to the destination device.

3. The system of claim 1, further comprising:

a response communicated to the initiator gateway over the network by the database, for control of the packetized data voice call, if, upon admission of the packetized data voice call at the initiator gateway to the network, the destination sub-network bandwidth remaining then-unused of the destination sub-network for the destination gateway is inadequate to accommodate the call bandwidth.

4. A system for communicating a VoIP call over a packetized data network, the network comprising a first market sub-network and a second market sub-network, the first market sub-network and the second market sub-network generally serving respective geographically remote locations, the call being made to a call destination of the network within the first market sub-network, the first market sub-network having a limited bandwidth capacity to accommodate additional communications on the first market sub-network, comprising:

a capacity limiter of the network, for limiting the call over the network if the limited bandwidth capacity of the first market sub-network is inadequate for accommodating the call at the call destination;

wherein the capacity limiter comprises:

a load distribution proxy communicatively connected to the network for controlling route of the call over the network;

a capacity limiting proxy communicatively connected to the network for selectively restricting the call to the first market sub-network; and a database application communicatively connected to the load distribution proxy and the capacity limiting proxy, for controlling the load distribution proxy and the capacity limiting proxy to, respectively, route communications on the first market sub-network to optimize extent of the limited bandwidth capacity of the first market sub-network and restrict communication of the call on the first market sub-network if the limited bandwidth capacity is insufficient for the call.

5. The system of claim 4, further comprising:

a plurality of signals communicated concurrently over the first market sub-network;

wherein the capacity limiter, upon initiation to the network of the call made to the call destination of the network, ascertains the limited bandwidth capacity of the first market sub-network and counts the call to determine to limit the call to the first market sub-network if the limited bandwidth capacity is inadequate for accommodating the call at the first market sub-network of the call destination.

6. A system for communicating a VoIP call over a packetized data network, the network comprising a first market sub-network and a second market sub-network, the first market sub-network and the second market sub-network generally serving respective geographically remote locations, the call being made to a call destination of the network within the first market sub-network, the first market sub-network having a limited bandwidth capacity to accommodate additional communications on the first market sub-network, comprising:

a capacity limiter of the network, for limiting the call over the network if the limited bandwidth capacity of the first market sub-network is inadequate for accommodating the call at the call destination; and a plurality of signals communicated concurrently over the first market sub-network;

wherein the capacity limiter comprises:

a load distribution proxy communicatively connected to the network for controlling route of the call over the network;

a capacity limiting proxy communicatively connected to the network for selectively restricting the call to the first market sub-network; and a database application communicatively connected to the load distribution proxy and the capacity limiting proxy, for controlling the load distribution proxy and the capacity limiting proxy to, respectively, route communications on the first market sub-network to optimize extent of the limited bandwidth capacity of the first market sub-network and restrict communication of the call on the first market sub-network if the limited bandwidth capacity is insufficient for the call;

wherein the capacity limiter, upon initiation to the network of the call made to the call destination of the network, ascertain the limited bandwidth capacity of the first market sub-network;

wherein the database application increments and decrements the communications then occurring over the first market sub-network to assess if the limited bandwidth capacity of the first market sub-network will accommodate the call.

7. The system of claim 6, wherein the database application comprises a processor for logically determining, based on identification of the call and measure of the limited bandwidth capacity then available, whether the limited bandwidth capacity is then-adequate on the first market sub-network to accommodate the call.

8. The system of claim 7, further comprising:

a response communicated by the load distribution proxy, passed over the network, to an ingress gateway of the network if the capacity limiting proxy is unavailable.

9. The system of claim 7, further comprising:

a response communicated by the capacity limiting proxy, passed over the network, to an ingress gateway of the network if the database application determines that capacity to accommodate the call on the first market sub-network is not then available.

10. A method of calling over a packet switched network, via a packetized voice data communication on the network, comprises the steps of:

introducing a packetized voice data call to the network via an ingress gateway of the network, the call destined for reception at an egress gateway of a market network subset of the network;

identifying by a centralized service system of the network the market network subset of the egress gateway, the centralized service system of the network communicatively positioned between the ingress gateway and the egress gateway of the market network subset, the centralized service system comprising a database for receiving an identifier of the market network subset of the step of identifying, the database comprises:

a load distribution proxy connected to the market network subset;

a capacity limiting proxy connected to the market network subset; and a processor connected to the load distribution proxy and the capacity limiting proxy, for determining, based on the identifier, the then unused bandwidth capacity of the market network subset;

ascertaining by the database whether the market network subset then has unused bandwidth capacity to accommodate the call;

controlling the load distribution proxy by the database, to route communications within the market network subset to provide then-unused bandwidth capacity of the market network subset;

controlling the capacity limiting proxy by the database, to limit the call over the market network subset if the then-unused bandwidth capacity of the market network subset can not accommodate the call; and limiting, by the centralized service system, communication of the call over the network to the market network subset of the network if the market network subset has inadequate unused bandwidth capacity to accommodate the call.

11. The method of claim 10, further comprising the step of:

receiving the call at the market network subset of the network if the market network subset then has unused bandwidth capacity to accommodate the call; and receiving the call over the market network subset at the egress gateway, after the step of receiving the call at the market network subset;

wherein the step of limiting does not occur if the market network subset can then accommodate the call.

12. The method of claim 11, further comprising the step of:

determining whether to perform the step of limiting, based on the then-available capacity of the market network subset and the egress gateway to receive the call.

13. The method of claim 12, further comprising the step of:

counting the call, together with communications on the market network subset, in the step of determining, to logically dictate whether to perform the step of limiting.

14. A system for communicating a packetized data voice call introduced through an ingress gateway onto a packet switched network, the network comprising a plurality of regional market networks interconnected through respective market gateways, the market gateways including pluralities of gateways variously interconnecting market networks and other links of the network, comprising:

a first regional market network of destination of the call, connectable via a first market gateway from among the plurality of market gateways for the regional market networks;

a centralized limiter platform of the network, intermediately communicatively located in the network between the ingress gateway and the first market gateway for the first regional market, for determining an availability of capacity of the first regional market network for carrying the call, the centralized limiter platform comprising:
a database;
a capacity limiting proxy connected to the database and the network; and
a load distribution proxy connected to the database and the network;

wherein the capacity limiting proxy is capable of limiting the call on the first regional market network of destination of the call, if the first regional market network can not then fully accommodate the call;

wherein the load distribution proxy is capable of diverting the call from the first market gateway of the first regional market network of destination of the call, if the first regional market network can not then accommodate the call;

wherein the load distribution proxy is capable of routing the call, together with other communications within the first regional market network, over the first regional market network of destination of the call, to accommodate the call;

wherein the centralized limiter platform determines whether capacity is available at the first regional market network for receiving the call and the database controls the capacity limiting proxy and the load distribution proxy accordingly.

* * * * *